United States Patent [19]
Lesieur

[11] Patent Number: 6,117,578
[45] Date of Patent: Sep. 12, 2000

[54] CATALYZED WALL FUEL GAS REFORMER

[75] Inventor: Roger R. Lesieur, Enfield, Conn.

[73] Assignee: International Fuel Cells, LLC, So. Windsor, Conn.

[21] Appl. No.: 09/061,115

[22] Filed: Apr. 16, 1998

[51] Int. Cl.[7] .................................................. H01M 8/18
[52] U.S. Cl. ............................. 429/19; 429/20; 422/200; 422/204; 422/240; 422/241
[58] Field of Search ...................... 429/19, 20; 422/200, 422/204, 240, 241; 48/61, 94

[56] References Cited

U.S. PATENT DOCUMENTS

| | | | |
|---|---|---|---|
| 3,607,130 | 9/1971 | Worley et al. | 23/288 M |
| 4,522,894 | 6/1985 | Hwang et al. | 429/17 |
| 4,898,792 | 2/1990 | Singh et al. | 429/19 |
| 4,900,712 | 2/1990 | Bar-Ilan et al. | 502/304 |
| 5,219,535 | 6/1993 | Giacobbe et al. | 422/201 |
| 5,242,574 | 9/1993 | Broutin et al. | 208/48 R |
| 5,356,728 | 10/1994 | Balachandran et al. | 429/8 |
| 5,733,347 | 3/1998 | Lesieur | 48/61 |
| 5,752,995 | 5/1998 | Kang | 48/198.7 |
| 5,882,614 | 3/1999 | Taylor et al. | 423/230 |

*Primary Examiner*—Kathryn Gorgos
*Assistant Examiner*—Wesley A. Nicolas
*Attorney, Agent, or Firm*—William W. Jones

[57] ABSTRACT

A fuel gas reformer assemblage for use in a fuel cell power plant is formed from a composite plate assembly which includes spaced-apart divider plates with interposed columns of individual fuel gas and burner gas passages. The fuel gas passages are provided with walls which are wash coated with a catalyzed alumina complex. The catalyst complex includes a nickel catalyst and a cerium and/or lanthanum oxide component which stabilizes the alumina against recrystalization in the catalyst complex. The catalyst complex also includes a calcium oxide component which inhibits carbon formation on the alumina surface. The cerium or lanthanum oxide and calcium oxide combine to provide a synergistic improvement in both alumina stabilization and also in inhibition of carbon deposits on the washcoated surfaces.

11 Claims, 2 Drawing Sheets

CATALYZED WALL FUEL GAS REFORMER

TECHNICAL FIELD

This invention relates to a fuel gas steam reformer assemblage. More particularly, this invention relates to a fuel gas steam reformer assemblage which is compact and lighter in weight than conventional steam reformer assemblages used in fuel cell power plants, wherein the reformer gas passages are washcoated with a stabilized and carbon-resistant alumina-nickel catalyst composite and wherein the burner gas passages may be washcoated with a stabilized and carbon-resistant non-catalyst-coated alumina composite.

BACKGROUND ART

Fuel cell power plants normally include fuel gas steam reformers which are operable to catalytically convert a fuel gas, such as natural gas, into hydrogen, carbon monoxide and carbon dioxide. The conversion involves passing a mixture of the fuel gas and steam through a catalytic bed which is heated to a reforming temperature of about 1,250° F. to about 1,600° F. Catalysts typically used are nickel catalysts which are deposited on alumina pellets. A typical reformer will consist of a plurality of reaction tubes which are contained in a housing that is insulated for heat retention. The reaction tubes are heated by burning excess fuel gas in the housing and passing the burner gasses over the reaction tubes. The individual reaction tubes will typically include a central exhaust passage surrounded by an annular entry passage. The entry passage is filled with the catalyzed alumina pellets, and a fuel gas-steam manifold is operable to deliver the fuel gas-steam mixture to the bottom of each of the entry passages whereupon the fuel gas-steam mixture flows through the catalyst beds. The resultant heated hydrogen, carbon monoxide, carbon dioxide and remaining stream gas mixture then flows through the central exhaust passages in each tube so as to assist in heating the inner portions of each of the annular catalyst beds; and thence from the reformer for further processing and utilization.

Steam reformers require a large catalyst bed surface area in order to provide a high degree of catalyst-fuel mixture interaction and a large heat transfer surface area to produce the amount of hydrogen required to operate the fuel cells at peak efficiency. This need for large catalyst bed and heat transfer surface area, when met by using catalyst-coated pellets in tubular reformers, results in undesirably large and heavy reformer assemblies. For example, a commercially available 200 KW acid fuel cell power plant includes a steam reformer component which has a volume of about 150 to 175 cubic feet; and weighs about 3,500 lbs.

My International Patent Application No. WO 97/24176, published Jul. 10, 1997, discloses an improved steam reformer structure which provides the necessary catalyzed and heat transfer surface area, is substantially smaller and lighter than presently available steam reformers, and can be operated at lower service temperatures. The improved steam reformer structure is formed from a series of essentially flat plate reformer components. Each of the reformer components includes reformer passages which are adjacent to a plurality of central regenerator/heat exchanger passages. Each of the reformer passage plate units is disposed directly adjacent to a burner passage plate unit so that the adjacent reformer and burner passages share a common wall.

All of the metal sheets which make up the flat plate reformer and some of the burner components of the assemblage may have surfaces covered with a catalyzed alumina coating. The surfaces to be catalyzed will be primed by means of a conventional wash coating process such as that provided by W. R. Grace and Co., or Engelhard Corp., for example. By washcoating the fuel gas passage walls in the reformer with a catalyzed and stabilized alumina composite; and in certain cases, washcoating the burner passages with a stabilized, catalyzed, or non-catalyzed, composite, the operating efficiency of the reformer assemblage can be enhanced.

DISCLOSURE OF THE INVENTION

This invention relates to an improved catalyzed and/or non-catalyzed washcoat composite for use with the aforesaid compact reformer assemblage; and to such an assemblage which includes the improved washcoat composite. The washcoat composite as a non-catalyzed substrate is formed from an alumina base with the addition of lanthanum oxide and/or cerium oxide and/or calcium oxide which results in an admixture substrate. A nickel catalyst is deposited on the washcoat substrate in certain of the assemblage passages. The catalyst can be present on the washcoat composite in amounts of up to about 25% by weight; the lanthanum oxide component can be present in the washcoat composite in amounts in the range of about 2% to about 5% by weight; and the calcium oxide component can be present in the washcoat composite in amounts in the range of about 5% to about 20% by weight; and ceria the range of up to 20% by weight, the remainder of the washcoat composite being alumina.

The burner passages of the assemblage may, in certain instances, be provided with an alumina-based substrate including some combination of lanthanum, calcium, or cerium oxide to form a composite washcoat, which may be without the catalyst component. When the washcoat is catalyzed in the burner section, the catalyst will normally be a noble metal such as platinum or palladium or a mixture of the same. Catalyzed burner sections are a potential option for a catalyzed wall reformer assembly because a catalyzed burner section can be included without significant alteration to a catalyzed reformer design. Catalyzed burner sections are important because they provide a mechanism for: (1) establishing more uniform burner gas temperature distributions; (2) improving burner gas heat transfer to the reformer reaction site; and (3) lowering the burner gas temperature, but at the expense of additional system complexity and cost. As a result, each potential application should be subjected to an engineering cost-benefits analysis in order to determine if catalyzed burner sections should be used in any specific application.

The alumina substrate upon which the catalyst layer is deposited is in the form of very fine crystals, thereby allowing the catalyst to exist on the substrate in a finely dispersed layer. The inclusion of the lanthanum oxide component in the alumina washcoat substrate synergistically stabilizes the substrate against recrystallization of the fine alumina crystals at relatively high operating temperatures extant in the reformer of a fuel cell power plant. In addition, the lanthanum oxide, calcium oxide and ceria components aid in suppressing carbon deposition on the washcoated walls of the reformer assemblage.

It is therefore an object of this invention to provide an improved catalyzed or non-catalyzed washcoat for a compact and lightweight fuel gas steam reformer assemblage.

It is an additional object of this invention to provide a fuel gas reformer assemblage which includes the improved washcoat.

It is a further object of this invention to provide a reformer assemblage of the character described wherein the washcoat includes a lanthanum-stabilized alumina component.

It is another object of this invention to provide a reformer assemblage of the character described wherein the washcoat is rendered resistant to carbon deposits by means of a calcium oxide component and/or a ceria component.

It is yet another object of this invention to provide a reformer assemblage of the character described wherein alumina component is synergistically stabilized and carbon deposition is synergistically eliminated by means of the lanthanum oxide, the cerium oxide, and the calcium oxide components.

These and other objects and advantages of this invention will become readily apparent to one skilled in the art from the following detailed description of a preferred embodiment of the invention when taken in conjunction with the accompanying drawings in which:

SPECIFIC MODE FOR CARRYING OUT THE INVENTION

Figure 1:
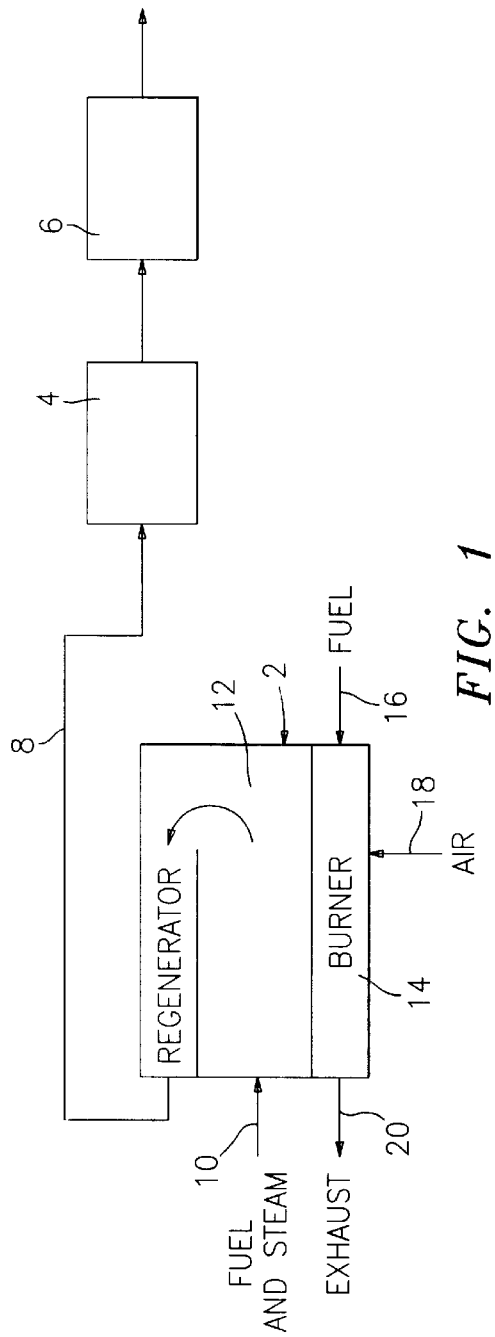
FIG. 1 is a schematic view of the fuel gas processing portion of a typical fuel cell power plant assembly.

Referring now to FIG. 1, there is shown a schematic view of a portion of a fuel processing assembly which forms a part of a typical fuel cell power plant. The fuel processing assembly includes a fuel steam reformer and regenerator station 2; a shift converter station 4; and a selective oxidizer station 6 which may be required for certain fuel cells that are intolerant to high levels of carbon monoxide. The reformer and regenerator station 2 is connected to a shift converter 4 by means of a line 8. The reformer and regenerator station 2 includes a fuel and steam inlet line 10 which feeds the fuel/steam mixture into the catalyzed reformer zone 12. A mixture of partially spent fuel from the fuel cell stack, and air, is fed into a burner component 14 via lines 16 and 18, and combusted therein to heat the fuel/steam mixture to reacting temperatures. The burner 14 is exhausted from the reformer and regenerator section 2 via line 20.

Figure 2:
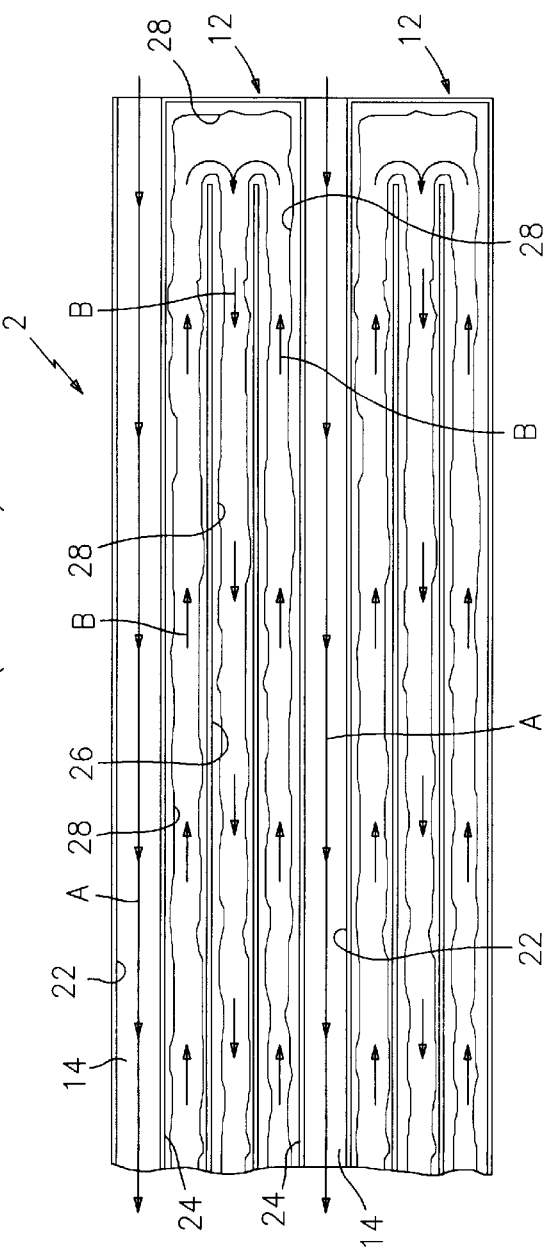
FIG. 2 is a schematic view of a portion of a fuel gas steam reformer assembly which is formed in accordance with this invention.
Figure 3:
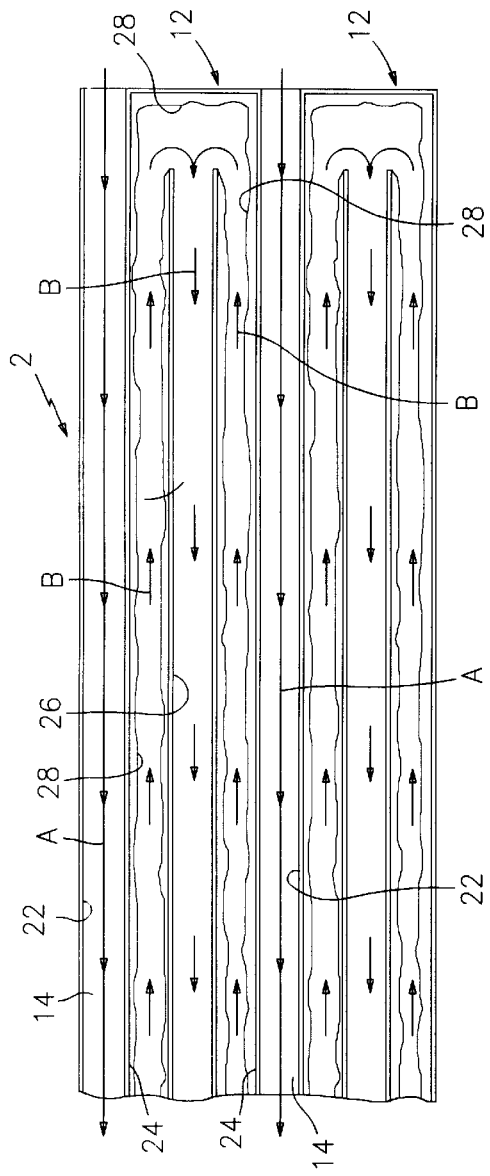
FIG. 3 is a schematic view similar to FIG. 2 but showing an alternative washcoat and catalyst pattern.
Figure 4:
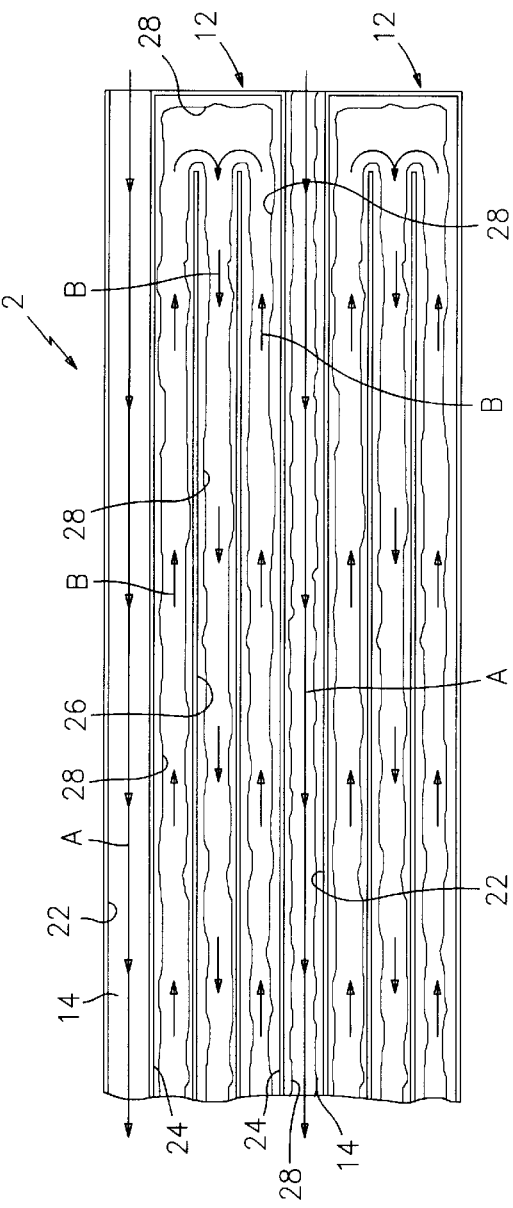
FIG. 4 is a schematic view similar to FIG. 2 but showing yet another alternative washcoat and catalyst pattern.

FIGS. 2–4 are schematic representations of several embodiments of a reformer and regenerator assembly which is formed in accordance with this invention. The reformer and regenerator assembly 2 includes spaced apart burner passages 14 which are interposed between spaced apart catalyzed fuel gas reformer passages 12. It will be noted that the burner passages 14 and fuel gas passages take the form of adjacent flat plates. Reference to the aforesaid World Patent Application will clarify the preferred manner of forming the passages. The arrows A and B indicate the direction of flow of the burner gases and the fuel gases respectively. In the embodiment shown in FIG. 2, the burner gases flow from right to left through the assembly 2 through tubes 22; and the fuel gases being reformed enter the assembly 2 flowing from left to right through tubes 24, and exit the assembly flowing from right to left through tube 26. The walls of the fuel gas tube 24 are provided with the catalyzed alumina washcoat 28 described above, while the tube 26 is provided with a non-catalyzed alumina washcoat 28. The reformer assembly is composed of an appropriate number of the above-described components 12 positioned side-by-side, and separated from each other by the burner gas sections 14. In the embodiment shown in FIG. 3, the process gas flow regenerator tubes 26 are not washcoated so that heat transfer may be enhanced; and in the embodiment shown in FIG. 4 the burner tubes 22 may be provided with the catalyzed washcoat 28 so that catalytic combustion may be used to generate the heat required for the reformer reaction.

The metal components of the reformer and regenerator, the heat exchanger, and the burner sections are preferably formed from a steel based alloy containing aluminum. The flat plate walls are formed from corrugated panels and/or U-shaped strips which are assembled by brazing or welding the assembly. The assembly is then heat treated to generate a surface coating of aluminum oxide on all of the exposed surfaces in the reformer, regenerator, and burner sections which provides a good surface for adhesion of the washcoat. A washcoat is then applied to at least the surfaces to be catalyzed. The washcoat can be applied to all of the exposed surfaces of the assemblage if so desired. The nickel catalyst is then applied to the washcoated surfaces of the fuel gas reformer passages, excluding the regenerators, and if required, the noble metal catalyst is applied to the burner passages. These catalysts can also be directly combined with the initial wash coat to eliminate the subsequent catalyzation step.

The use of the plate construction with outer planar parts and inner separate passages results in a lightweight, strong steam reformer assembly which provides large surface area per unit volume. The aforesaid plate construction can be used with advantage in connection with steam reformers in a fuel cell power plant, or with stand alone steam reformers of the type shown in U.S. Pat. No. 4,098,587, granted Jul. 4, 1978 to O. L. Olesen et al, and others. Some or all surfaces, except for regenerator surfaces, of the fuel gas reformer sections of the reformer assembly can be catalyzed after wash coating the assembled reformer. Alternatively, the wash coating and catalyzing processes can be combined into a single step. The fact that the heated sections of the assembly share common walls with the reformer sections allows the reformer walls to be operated at lower temperatures than the currently available catalyzed pellet-type reformers. The weight and size savings achieved by using the plate-type construction described above is enhanced with larger higher power output fuel cell power plants, or stand-alone reformers. The inclusion of the lanthanum oxide component in the catalyzed wash coating stabilizes the alumina component against recrystallization at high operating temperatures, while the inclusion of ceria, lantanum and calcium oxide provides longer operational life to the assembly by hindering carbon deposition in the flow passages.

Since many changes and variations of the disclosed embodiment of the invention may be made without departing from the inventive concept, it is not intended to limit the invention other than as required by the appended claims.

What is claimed is:

1. A hydrocarbon fuel gas steam reformer assembly comprising:

a) a plurality of fuel gas passages for receiving a mixture of fuel gas and steam;

b) a plurality of burner gas passages for receiving a burner gas stream, said burner gas passages and said fuel gas passages being disposed in heat exchange relationship with each other whereby heat from said burner passages is transferred to said fuel gas passages; and c) selected ones of said fuel gas and burner gas passages being provided with a lanthanum oxide, and/or cerium oxide, and/or calcium oxide-stabilized alumina washcoat, which washcoat stabilizes alumina against recrystallization at elevated temperatures, and also inhibits carbon deposition on walls of said fuel gas and/or burner gas passages.

2. The fuel gas steam reformer assembly of claim 1, wherein said washcoat is catalyzed in certain ones of said burner and/or fuel gas passages.

3. The fuel gas steam reformer assembly of claim 1, wherein said washcoat is catalyzed in said fuel gas passages.

4. The fuel gas steam reformer assembly of claim 3, wherein said washcoat is catalyzed with nickel.

5. The fuel gas steam reformer assembly of claim 1, wherein said washcoat is catalyzed in said burner gas passages.

6. The fuel gas steam reformer assembly of claim 5, wherein said washcoat is catalyzed with a nobel metal or a mixture of nobel metals.

7. The fuel gas steam reformer assembly of claim 6, wherein said catalyst is platinum.

8. The fuel gas steam reformer assembly of claim 6, wherein said catalyst is palladium.

9. The fuel gas steam reformer assembly of claim 6, wherein said catalyst is a mixture of platinum and palladium.

10. A hydrocarbon fuel gas steam reformer assembly comprising:
    a) a plurality of fuel gas passages for receiving a mixture of fuel gas and steam;
    b) a plurality of burner gas passages for receiving a burner gas stream, said burner gas passages and said fuel gas passages being disposed in heat exchange relationship with each other whereby heat from said burner passages is transferred to said fuel gas passages; and
    c) said fuel gas passages being provided with a cerium oxide, and/or lanthanum oxide, and/or calcium oxide-stabilized catalyzed alumina washcoat, which washcoat stabilizes alumina against recrystallization at elevated temperatures, and also inhibits carbon deposition on walls of said fuel gas passages.

11. A hydrocarbon fuel gas steam reformer assembly comprising:
    a) a plurality of fuel gas passages for receiving a mixture of fuel gas and steam;
    b) a plurality of burner gas passages for receiving a burner gas stream, said burner gas passages and said fuel gas passages being disposed in heat exchange relationship with each other whereby heat from said burner passages is transferred to said fuel gas passages; and
    c) selected ones of said burner gas passages being provided with a cerium oxide, and/or lanthanum oxide, and/or calcium oxide-stabilized catalyzed alumina washcoat which washcoat stabilizes alumina against recrystallization at elevated temperatures, and also inhibits carbon deposition on walls of said burner gas passages.

* * * * *